Dec. 1, 1970     T. L. BARRY     3,544,481
EUROPIUM-ACTIVATED ALKALINE EARTH ORTHOSILICATE PHOSPHOR
Filed Dec. 1, 1967
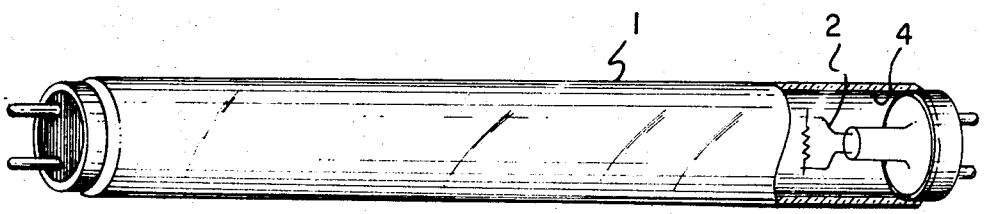
THOMAS L. BARRY
INVENTOR

United States Patent Office 3,544,481
Patented Dec. 1, 1970

3,544,481
EUROPIUM-ACTIVATED ALKALINE EARTH
ORTHOSILICATE PHOSPHOR
Thomas L. Barry, Beverly, Mass., assignor to Sylvania
Electric Products Inc., a corporation of Delaware
Filed Dec. 1, 1967, Ser. No. 687,359
Int. Cl. C09k 1/54
U.S. Cl. 252—301.4                                      1 Claim

ABSTRACT OF THE DISCLOSURE

Phosphors having the composition $$M_aMg_bEu_cSi_2O_8$$

where:

M is calcium, strontium and/or barium,
$a$ is between about 2.75 and 3.25,
$b$ is between about 0.75 and 1.25, and
$c$ is between about 0.0004 and 0.40, are disclosed. The phosphors have strong emissions with narrow emission bands in the blue region of the spectrum when excited by ultraviolet radiation and are useful in fluorescent lamps.

BACKGROUND OF THE INVENTION

Field of the invention

This invention relates to phosphor-containing arc discharge lamps. It is particularly related to fluorescent lamps having a phosphor which can be energized by ultraviolet light to emit preferentially in the blue region of the spectrum.

Description of the prior art

Phosphors commonly used with arc discharge lamps include pyrophosphates, halophosphates and tungstates. The light emitted from such phosphors is generally broadband and can be satisfactory in a blend when a white light is desired. However, in some applications, such as photocopying or photochemical processing, it is desirable to use a lamp having narrow band emission and maximum intensity at the wavelength to which the photosensitive material is most responsive. Accordingly, a narrow band emitting phosphor is desirable in such lamps.

In some of such applications, the preferred emission is in the blue region of the spectrum. Presently available blue emitting phosphors have an undesirably broad band width. Some examples, as shown in Table I, include: (A) tin-activated strontium pyrophosphate; (B) barium-titanium phosphate; (C) lead-activated calcium tungstate; (D) magnesium tungstate; (E) antimony-activated calcium halophosphate. The width of the emission band at half maximum intensity and the wavelength at which the maximum intensity occurs are shown.

TABLE I

| Phosphor | Wavelength of maximum emission (A.) | Width of band at half intensity (A.) |
|---|---|---|
| A. $Sr_2P_2O_7$:Sn | 4,600 | 1,100 |
| B. $Ba_2P_2O_7$:$TiO_2$ | 4,950 | 1,680 |
| C. $CaWO_4$:Pb | 4,350 | 1,250 |
| D. $MgWO_4$ | 4,750 | 1,380 |
| E. $Ca_5FP_3O_{12}$:Sb | 4,700 | 1,450 |

While these phosphors are useful in blends for white emitting fluorescent lamps, it would be desirable, for certain applications, to have a narrower band width and to be able to change the wavelength at which maximum intensity occurs.

For the phosphors listed in Table I, no way of obtaining substantially narrower band width is commonly known.

In addition, for phosphors A, B and D, no way of changing the location of the emission peak through various wavelengths is commonly known. With phosphor C, the peak can be shifted from about 4150 to about 4400 A. by varying the lead concentration. With phosphor E, the peak can be shifted from about 4700 A. to about 4900 A. by the substitution of chloride for fluoride.

Since the photosensitive materials mentioned above are particularly responsive to only part of the broad band emission, the efficiency of the lamp and associated photosensitive equipment is correspondingly low. To improve the efficiency, the phosphor should emit in a band of narrow width which closely corresponds to the excitation peak of the photosensitive material.

British Pat. 544,160 discloses luminescent materials which are excited by the 3650 A. mercury line wherein the luminescent material or phosphor comprises a matrix of an alkaline earth silicate activated by europium. The patent teaches that when the alkaline earth metal is calcium, strontium or barium, the corresponding emission is strongest in the yellow-green, yellow or green regions respectively. When the alkaline earth consists of both strontium and barium, strongest emission in the yellow-green region is obtained.

SUMMARY OF THE INVENTION

I have discovered an improved arc discharge lamp which contains an alkaline-earth, divalent europium-activated, orthosilicate phosphor which unexpectedly emits strongly in the blue region of the spectrum and in a relatively narrow band width. In order to obtain the narrow band blue emission, the phosphor must include magnesium, and its composition must be within certain controlled limits. The phosphor shows brilliant blue fluorescence when excited by ultraviolet radiation. It responds well to radiation at 2537 A. wavelength as well as to radiation obtained from a blacklight lamp which has a broad ultraviolet spectrum from 3100 to 4000 A. When measured on a radiometer, phosphors within these limits show narrow emission bands, as shown in Table II.

TABLE II

| Phosphor Composition | Wavelength of maximum emission (A.) | Width of band at half intensity (A.) |
|---|---|---|
| $Ca_3MgSi_2O_8$:$Eu^{2+}_{0.04}$ | 4,750 | 520 |
| $Sr_3MgSi_2O_8$:$Eu^{2+}_{0.04}$ | 4,580 | 390 |
| $Ba_3MgSi_2O_8$:$Eu^{2+}_{0.04}$ | 4,370 | 310 |

The individual elements, calcium, strontium or barium, may be replaced by a mixture of any two of these three elements, or by all three simultaneously. When such a replacement is made, phosphors which are quite similar in excitation and emission characteristics are obtained. These characteristics are shown in Tables III, IV and V for phosphors containing two of the elements simultaneously.

TABLE III

Phosphors With The Composition $Ca_xSr_{3-x}MgSi_2O_8$:$Eu^{2+}_{0.04}$

| Atoms of calcium (x) | Atoms of strontium | Wavelength of maximum emission (A.) | Width of band at half intensity (A.) |
|---|---|---|---|
| 0.00 | 3.00 | 4,580 | 390 |
| 0.30 | 2.70 | 4,600 | 420 |
| 0.60 | 2.40 | 4,630 | 440 |
| 0.90 | 2.10 | 4,670 | 480 |
| 1.20 | 1.80 | 4,670 | 480 |
| 1.50 | 1.50 | 4,670 | 480 |
| 1.80 | 1.20 | 4,670 | 500 |
| 2.10 | 0.90 | 4,640 | 580 |
| 2.40 | 0.60 | 4,680 | 600 |
| 2.70 | 0.30 | 4,730 | 630 |
| 3.00 | 0.00 | 4,750 | 520 |

TABLE IV

Phosphors With the Composition $Sr_xBa_{3-x}MgSi_2O_8:Eu^{2+}{}_{0.04}$

| Atoms of strontium (x) | Atoms of barium | Wavelength of maximum emission (A.) | Width of band at half intensity (A.) |
|---|---|---|---|
| 0.00 | 3.00 | 4,370 | 310 |
| 0.30 | 2.70 | 4,370 | 340 |
| 0.60 | 2.40 | 4,370 | 380 |
| 0.90 | 2.10 | 4,350 | 390 |
| 1.20 | 1.80 | 4,350 | 400 |
| 1.50 | 1.50 | 4,350 | 440 |
| 1.80 | 1.20 | 4,420 | 470 |
| 2.10 | 0.90 | 4,420 | 480 |
| 2.40 | 0.60 | 4,540 | 460 |
| 2.70 | 0.30 | 5,420 | 480 |
| 3.00 | 0.00 | 4,580 | 390 |

TABLE V

Phosphors With The Composition $Ca_xBa_{3-x}MgSi_2O_8:Eu^{2+}{}_{0.04}$

| Atoms of calcium (x) | Atoms of barium | Wavelength of maximum emission (A.) | Width of band at half intensity (A.) |
|---|---|---|---|
| 0.00 | 3.00 | 4,370 | 310 |
| 0.30 | 2.70 | 4,600 | 900 |
| 0.60 | 2.40 | 4,550 | 780 |
| 0.90 | 2.10 | 4,500 | 610 |
| 1.20 | 1.80 | 4,430 | 520 |
| 1.50 | 1.50 | 4,430 | 510 |
| 1.80 | 1.20 | 4,430 | 560 |
| 2.10 | 0.90 | 4,500 | 640 |
| 2.40 | 0.60 | 4,600 | 770 |
| 2.70 | 0.30 | 4,720 | 740 |
| 3.00 | 0.00 | 4,750 | 520 |

It is not necessary for purposes of this invention to maintain the ratio of the number of the alkaline earth elements calcium, strontium and barium to the number of magnesium atoms exactly at 3/1 as the formulas are written above. Also, it is not necessary to maintain the ratio of the total number of alkaline earth atoms, including the magnesium atoms, to the number of silicon atoms exactly at 4/2 as the formulas are written above.

A general formula may be written in the form $$M_aMg_bEu_cSi_2O_8$$

where:

M is calcium, strontium and/or barium,
$a$ is between about 2.75 and 3.25,
$b$ is between about 0.75 to 1.25,
$c$ is between about 0.0004 and 0.40.

A few examples of phosphors within this general formula are given in Table VI.

TABLE VI

| Formulation | Wavelength of maximum emission (A.) | Width of band at half intensity (A.) |
|---|---|---|
| $(BaSrCa) Mg Si_2O_8:Eu^{2+}{}_{0.04}$ | 4,430 | 530 |
| $(Ba_{0.375}Sr_{2.25}Ca_{0.375})MgSi_2O_8:Eu^{2+}{}_{0.04}$ | 4,570 | 510 |
| $(Ba_{0.75}Sr_{0.75}Ca_{1.50})MgSi_2O_8:Eu^{2+}{}_{0.04}$ | 4,500 | 580 |
| $(Ba_{1.50}Sr_{0.75}Ca_{0.75})MgSi_2O_8:Eu^{2+}{}_{0.04}$ | 4,400 | 480 |

When these limits are maintained, it is frequently found that the X-ray diffraction pattern is substantially that of a single phase material, which is a solid solution of the general formula $M_3MgSi_2O_8$, or is a mixture of two solid solutions with the same general formula. If the atoms represented as M are chosen from the pairs (Ca, Sr), or (Sr, Ba), the phosphor is substantially a single phase solid solution. If, however, the atoms represented by M are the pair (Ca, Ba), a mixture of two materials is more commonly obtained. This is due to the formation of the intermediate compound $BaCa_2MgSi_2O_8$. X-ray diffraction studies of subsolidus compositions intermediate to $Ba_3MgSi_2O_8$ and $Ca_3MgSi_2O_8$ indicate a very limited solubility of $Ca_3MgSi_2O_8$ in $Ba_3MgSi_2O_8$, probably of the order of 10 mole percent. Patterns of compositions between 10 and 40 mole percent $Ca_3MgSi_2O_8$ exhibit two distinct phases: one, a $Ba_3MgSi_2O_8$ solid solution, and the other, a $BaCa_2MgSi_2O_8$ solid solution. Between 40 and 80 mole percent $Ca_3MgSi_2O_8$, a large single phase region with the $BaCa_2MgSi_2O_8$ structure exists. From 80 mole percent $Ca_3MgSi_2O_8$ on up to the pure compound itself two crystalline phases co-exist, one a $BaCa_2MgSi_2O_8$ solid solution, and the other, essentially pure $Ca_3MgSi_2O_8$.

An arc discharge lamp according to this invention includes a transparent envelope the inside surface of which has a coating of the phosphor mentioned above. Within the envelope are electrodes and a mercury fill to produce the usual mercury emission lines. The phosphor is excited to fluorescence by the mercury radiation, epsecially the 2537 A. line, and emits strongly in the blue region in a relatively narrow band width.

BRIEF DESCRIPTION OF THE DRAWING

The single drawing, partly broken away, shows an arc discharge lamp containing a blue-emitting phosphor, in accordance with this invention.

DESCRIPTION OF THE PREFERRED EMBODIMENT

As shown in the drawing, one embodiment of an arc discharge lamp in accordance with this invention comprises a glass envelope 1 and electrodes 2 at each end of the lamp. Within envelope 1 is a fill which includes mercury. On the inner surface of envelope 1, there is a coating 4 of an alkaline earth europium-activated orthosilicate phosphor. When an arc is struck between the electrodes, the resultant ultraviolet radiation impinges onto phosphor 4 and excites it to fluorescence. The resultant fluorescence is predominantly blue and of relatively narrow band width.

In order to obtain the unexpected blue radiation, the composition of phosphor 4 must be carefully controlled within certain limits, as mentioned previously. In preparing the phosphor, the ingredients must be of high chemical purity and are preferably mixed dry. The mixture is fired, preferably in alumina trays, between 1100° C. and 1300° C. for 2 to 12 hours in an atmosphere of 80% nitrogen and 20% hydrogen. The fired mixture is cooled to room temperature in the same reducing atmosphere. Ammonium chloride may be used as a flux to enhance the crystallinity of the fired product.

The following examples are offered as specific embodiments of my invention.

EXAMPLE I $(Ca_{1.0}Sr_{1.0}Ba_{1.0}Eu_{0.04})Mg_{1.0}(SiO_4)_2$

| Material | Moles | Grams |
|---|---|---|
| $BaCO_3$ | 1.00 | 5.921 |
| $SrCO_3$ | 1.00 | 4.429 |
| $CaCO_3$ | 1.00 | 3.003 |
| $3MgCO_3 \cdot MgOH_2 \cdot 3H_2O$ | 0.25 | 2.740 |
| $SiO_2$ | 2.00 | 3.605 |
| $Eu_2O_3$ | 0.02 | 0.211 |
| $NH_4Cl$ | 0.40 | 0.642 |

The weighed materials were intimately mixed by dry blending in a 100 ml. polystyrene mixing jar. Glass beads were added to aid in the blending. After mixing for 15 minutes the glass beads were removed and approximately 25 grams of the mixture was placed in an alumina boat. The boat was fired at 1200° C. for 4 hours in an atmosphere of 80% nitrogen and 20% hydrogen and allowed to cool for 30 minutes in the same atmosphere. The fired material was then given a water wash to remove any residual chloride and dried. The resultant phosphor was pulverized, dispersed in a suitable liquid and coated on the inner surface of envelope 1 by processes commonly used in the industry.

The same mixing and firing procedure was used in the following examples.

EXAMPLE II $(Ba_{1.50}Sr_{1.50}Eu_{0.04})Mg_{1.0}(SiO_4)_2$

| Material | Moles | Grams |
|---|---|---|
| $BaCO_3$ | 1.50 | 8.881 |
| $SrCO_3$ | 1.50 | 6.643 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.02 | 0.211 |
| $NH_4Cl$ | 0.40 | 0.642 |

EXAMPLE III $(Ca_{1.50}Sr_{1.50}Eu_{0.04})Mg_{1.0}(SiO_4)_2$

| Material | Moles | Grams |
|---|---|---|
| $CaCO_3$ | 1.50 | 4.504 |
| $SrCO_3$ | 1.50 | 6.643 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.02 | 0.211 |
| $NH_4Cl$ | 0.40 | 0.642 |

EXAMPLE IV $(BaCa_2Eu_{0.04})Mg_{1.0}(SiO_4)_2$

| Material | Moles | Grams |
|---|---|---|
| $BaCO_3$ | 1.00 | 5.921 |
| $CaCO_3$ | 2.00 | 6.005 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.02 | 0.211 |
| $NH_4Cl$ | 0.40 | 0.642 |

EXAMPLE V $(Ba_3Eu_{0.04})Mg_{1.0}(SiO_4)_2$

| Material | Moles | Grams |
|---|---|---|
| $BaCO_3$ | 3.00 | 17.762 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.02 | 0.211 |
| $NH_4Cl$ | 0.40 | 0.642 |

EXAMPLE VI $(Ba_{1.25}Sr_{0.75}Ca_{0.75}Eu_{0.02})Mg_{1.0}(SiO_4)_2$

| Material | Moles | Grams |
|---|---|---|
| $BaCO_3$ | 1.25 | 7.401 |
| $SrCO_3$ | 0.75 | 3.322 |
| $CaCO_3$ | 0.75 | 2.252 |
| $3MgCO_3 \cdot Mg(OH)_2 \cdot 3H_2O$ | 0.25 | 2.740 |
| $SiO_2$ | 2.00 | 3.605 |
| $Eu_2O_3$ | 0.01 | 0.106 |
| $NH_4Cl$ | 0.40 | 0.642 |

Various changes in the details and materials which have been described herein may be made by those skilled in the art within the principle and scope of the invention as expressed in the anppended claim.

I claim:
1. A divalent-europium activated alkaline-earth orthosilicate phosphor having the formula

$$M_aMg_bEu_cSi_2O_8$$

where:

M is calcium, strontium and/or barium,
$a$ is between about 2.75 and 3.25,
$b$ is between about 0.75 and 1.25, and
$c$ is between about 0.0004 and 0.40.

References Cited

UNITED STATES PATENTS

| 2,868,733 | 1/1959 | Cox et al. | 252—301.4 |
| 3,431,215 | 3/1969 | Chenot | 252—301.4 |

FOREIGN PATENTS

| 115,419 | 7/1942 | Australia | 252—301.4 |

TOBIAS E. LEVOW, Primary Examiner

J. COOPER, Assistant Examiner